Figure 1:
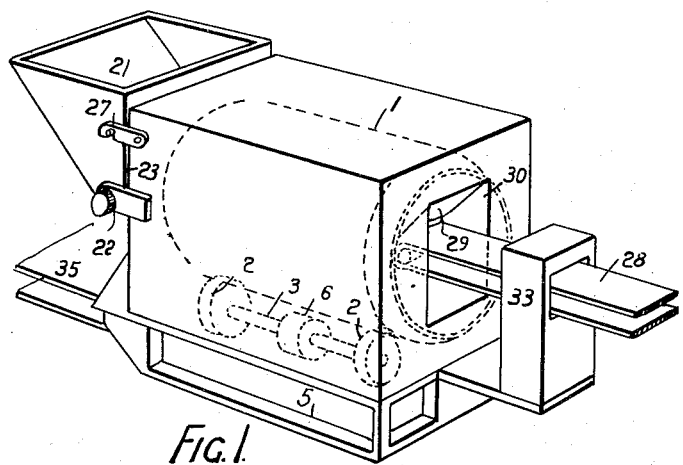

April 9, 1957  H. A. FAERBER  2,787,978
MACHINE FOR COATING WITH SUGAR JUBES, JELLIES
AND LIKE CONFECTIONS
Filed Jan. 6, 1955

INVENTOR:
HANS ARTHUR FAERBER
BY
Howson & Howson
ATTYS.

2,787,978

MACHINE FOR COATING WITH SUGAR JUBES, JELLIES AND LIKE CONFECTIONS

Hans Arthur Faerber, Chippendale, Sydney, Australia

Application January 6, 1955, Serial No. 480,176

Claims priority, application Australia January 28, 1954

5 Claims. (Cl. 118—19)

In the coating of jubes, jellies and like confections (all of which are embraced by the term "jubes" used herein) with sugar, the jubes, moulded in starch are brushed to remove the starch. They are then passed through a steam chamber where the surface of the jubes is softened to a gelatinous condition and moistened. The softened jubes are immersed in sugar for the sugar grains to adhere thereto and subsequently, they are passed through a shaking device wherein the surplus sugar is removed. Finally the jubes with the sugar grains adhering thereto are steam treated for the purpose of creating a preservative sugar coating thereon.

The sugar shaken from the jubes has a certain moisture content and the practice hitherto has been to lift it by a cup elevator from a collecting receptacle in the shaking device to a position where, on discharge, it is mixed with a fresh supply of dry sugar which replaces the sugar used on the jubes. The moist sugar adheres to the cups and conveyor system and frequent stoppages are necessary to remove the sugar therefrom.

The invention provides a machine for coating the jubes with sugar after the jubes have been softened and moistened by steam as stated above. The machine returns the surplus moist sugar to a position where it is used to coat other jubes which are fed to the machine in a continuous operation. Dry sugar, to replenish the sugar used on the jubes is added to the moist sugar in the machine and absorbs some of the moisture. The sugar is kept in motion throughout the time the machine is in operation; consequently the amount of sugar adhering to the machine, if any, is insufficient to interfere with the effective operation of the machine.

The machine consists of a drum mounted on a frame for rotation on a horizontal axis. The drum has open ends and one or more spiral ribs fixed on the internal wall of the drum is or are set to cause sugar in the drum to travel to one end of the drum, which is the inlet end. At the inlet end the rib or ribs has or have a fin or fins which project toward the centre of the drum. A cylinder having open ends is mounted in the drum for rotation therewith. The cylinder extends from near the thin or fins through the outlet end of the drum. The first part of the cylinder that is at the inlet end is made of sheet material and the other part is made of a perforated material, for example, gauze. One or more spiral ribs fixed on the internal wall of the cylinder are set to cause jubes deposited in the inlet end of the cylinder to travel through it and fall from the outlet end. Means are provided to deliver sugar to the machine and other means to direct sugar falling from the fins into the cylinder said latter means comprising a ramp mounted on a frame on the discharge end of a jube delivery conveyor, a flange on the outlet end of the drum set at substantially a right angle and a flange on the inlet end set outwardly and obliquely towards the centre, a ring on the fins, a flange on the outlet end of the cylinder to register with the corresponding flange on the drum and a flange on the inlet end set outwardly and obliquely towards the centre with fins on said flange to register with said ring. Means are provided to rotate the drum and other means are provided to deposit jubes in the cylinder and to receive jubes discharged from the cylinder.

The method of adding the dry sugar to replenish the sugar used on the jubes as mentioned above is important as it enables a continuous process to be maintained. The dry sugar is fed into the drum at a point some distance inside the drum. When the dry sugar enters the drum, it mixes with the moistened surplus sugar and thus absorbs some of its moisture as was mentioned before. When the dry sugar enters the drum it passes through the perforations in the drum and then mixes with the surplus moist sugar which has separated from the jubes and has also passed through the perforations. The mixing of the sugar while being recycled allows the dry newly added sugar to absorb some of the moisture of the surplus moist sugar.

In practice it has been found that the jubes already coated with sugar and the moistened surplus sugar with the added dry sugar segregate to large extent on different sides of the drum allowing the surplus sugar to readily pass through the perforations and thus be recycled.

Figure 2:
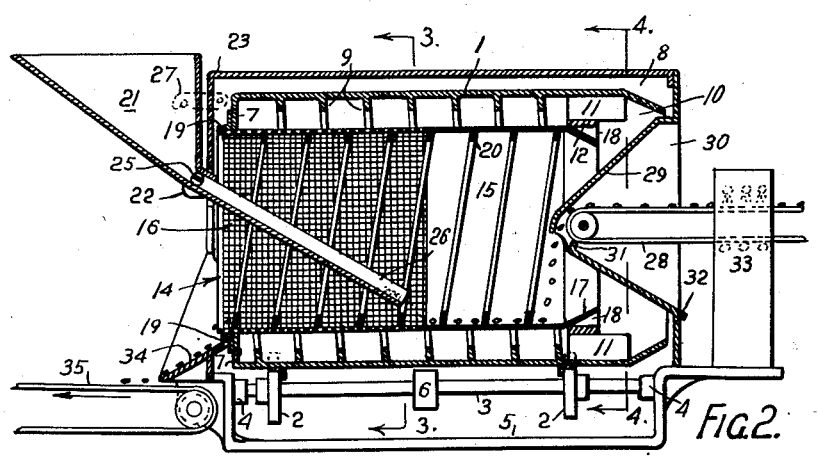
Figure 3:
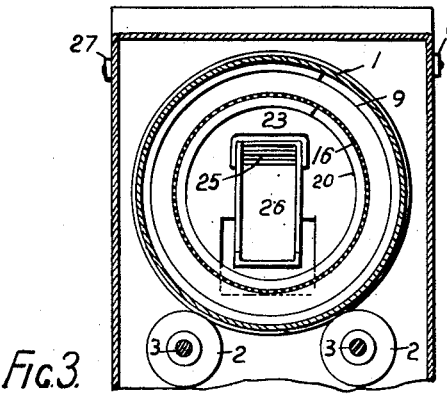
Figure 4:
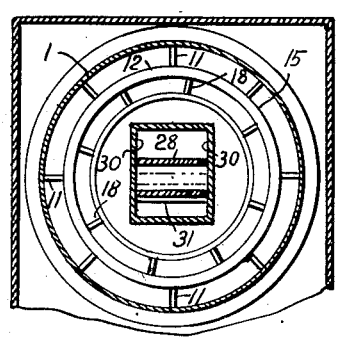

The invention is described in further detail with reference to the annexed drawings wherein Fig. 1 is a perspective view of the machine; Fig. 2 is a longitudinal central sectional elevation thereof; Figs. 3 and 4 are sections on lines 3—3 and 4—4 respectively of Fig. 2.

The drum 1 is supported on rollers 2 on shafts 3 mounted in bearings 4 on a machine base 5. Means are provided to rotate the drum through one of the shafts. A belt drive 6 from a motor (not shown) is indicated as an example of a drive.

The drum 1 has a flange 7 at the outlet end set inwardly at substantially a right angle and at the inlet end it has a flange 8 which is set outwardly from the end and obliquely towards the centre. A four start spiral rib 9 fixed to the internal wall of the drum is set to cause sugar in the drum (when it is rotated) to travel to the inlet end 10 of the drum. At the inlet end fins 11 on the ends of the ribs project towards the centre of the drum. A ring support 12 is fixed to the inner portion of the fins.

A cylinder having open ends is mounted in the drum 1 for rotation therewith. It extends from the fins 11 through the outlet end 14 of the drum. The first part 15 of the cylinder which is approximately one half the length of it is made of sheet material and the other part 16 is made of gauze. The first part 15 at the inlet end has a flange 17 which is set outwardly from the end and obliquely towards the centre. Fins 18 on this flange support the first part of the cylinder on the ring support 12. A flange 19 on the other end of the cylinder is fixed to the drum flange 7 by screws. A single or multiple start spiral rib 20 fixed to the internal wall of the cylinder is set, as stated above, to cause the jubes in the cylinder to travel through it and fall from the outlet end 14.

A hopper 21 for sugar to replenish the supply in the machine is pivotally mounted as at 22 on frame 23 at the outlet end of the machine. It has a gravity discharge outlet with a valve 25 thereon. A gravity chute 26 extends from the outlet into the cylinder and terminates in the gauze section. The hopper is retained in position to discharge into the cylinder by a catch 27. It can be released from the catch and turned about the pivot to be emptied when the machine is not in use.

An endless conveyor 28 is mounted on supports arranged so that the conveyor can be moved to a designed position where its discharge end projects into the inlet end of the machine. It can be moved clear of the machine to permit access to the machine for cleaning. At the discharge end a ramp 29 is mounted on the conveyor frame.

In operation it is positioned to direct sugar falling from the fins 11 into the cylinder near the inlet end. Side plates 30 on the ramp prevent sugar falling onto the conveyor. At the discharge end of the conveyor a scraper 31 is arranged to eject jubes which may adhere to the conveyor. A drip tray 32 is also provided to divert water condensed from steam, after the conveyor passess through the steam heater 33, falling into the machine.

At the discharge end of the machine a ramp 34 deposits the jubes onto conveyor 35.

In operation jubes fed onto the conveyor 28 are softened and moistened as they pass through the heater 33. The jubes are deposited in the rotating cylinder. The jubes are coated with sugar as they travel through the first part 15 of the cylinder and the surplus sugar is removed therefrom as they travel through the gauze part 16 of the cylinder. The spiral rib causes the jubes and sugar to travel through the first part of the cylinder with a rolling action and the jubes are travelled throughout the gauze part in the same manner. The jubes fall onto the conveyor 35 and are taken by it to the next treatment apparatus.

I claim:

1. A machine for coating jubes with sugar, said machine consisting of a drum mounted on a frame for rotation on a horizontal axis, said drum having open ends and at least one spiral rib on the internal wall set to cause sugar in the drum to travel to one end which is the inlet end, said rib having a fin on the inlet end which projects towards the centre of the drum, a cylinder having open ends mounted in the drum for rotation therewith, said cylinder extending from said fin through the other end of the drum which is the outlet end, the first part of said cylinder that is at the inlet end being made of a sheet material and the other part made of a perforated material, at least one spiral rib on the internal wall of the cylinder set to cause jubes to travel through the cylinder and fall from the outlet end, separate means to deliver sugar to the machine, means to direct sugar falling from the fin into the cylinder, said latter means comprising a ramp mounted on a frame on the discharge end of a jube delivery conveyor, a flange on the outlet end of the drum set at substantially a right angle and a flange on the inlet end set outwardly and obliquely towards the centre, a ring on the fins, a flange on the outlet end of the cylinder to register with the corresponding flange on the drum and a flange on the inlet end set outwardly and obliquely towards the centre with fins on said flange to register with said ring means to rotate said drum, means to deposit jubes in the cylinder and to receive jubes discharged from the cylinder.

2. Machine for coating jubes with sugar as claimed in claim 1 having a plurality of ribs in the drum constructed as a multiple start spiral.

3. Machine for coating jubes with sugar consisting of a drum mounted on a frame for rotation on a horizontal axis, said drum having open ends with a flange on the outlet end set at substantially a right angle and a flange on the inlet end set outwardly and obliquely towards the centre, at least one spiral rib on the internal wall of said drum set to cause sugar to travel to the inlet end, said rib having a fin on the inlet end which projects towards the centre of the drum, a ring on said fin, a cylinder having open ends with a flange on the outlet end to register with the substantially right angle flange on the drum and a flange on the inlet end set outwardly and obliquely towards the centre with a fin thereon adapted to register with the ring on the drum fin, the first part of said cylinder that is at the inlet end being made of a sheet material and the other part made of a perforated material, at least one spiral rib on the internal wall of said cylinder set to cause jubes to travel through the cylinder and fall from the outlet end, separate means to deliver sugar to the machine intermediate the ends of the cylinder, means to direct sugar falling from the fin into the cylinder, means to rotate said drum, means to deposit jubes in the cylinder.

4. Machine for coating jubes with sugar consisting of a drum mounted on a frame for rotation on a horizontal axis, said drum having open ends with a flange on the outlet end set at substantially a right angle and a flange on the inlet end set outwardly and obliquely towards the centre, at least one spiral rib on the internal wall of said drum set to cause sugar to travel to the inlet end, said rib having a fin on the inlet end which projects towards the centre of the drum, a ring on said fin, a cylinder having open ends with a flange on the outlet end to register with the substantially right angle flange on the drum and a flange on the inlet end set outwardly and obliquely towards the centre with a fin thereon adapted to register with the ring on the drum fin, the first part of said cylinder that is at the inlet end being made of a sheet material and the other part made of a perforated material, at least one spiral rib on the internal wall of the cylinder set to cause jubes to travel through the cylinder and fall from the outlet end, separate means to deliver sugar to the machine consisting of a hopper pivotally mounted on a frame at the outlet end of the machine, a gravity discharge outlet from said hopper with a valve thereon, a gravity discharge chute extending from the outlet into the cylinder adjacent the junction of said first part with the other part, means to direct sugar falling from the fin into the cylinder, means to rotate said drum, means to deposit jubes in the cylinder.

5. Machine for coating jubes with sugar consisting of a drum mounted on a frame for rotation on a horizontal axis, said drum having open ends with a flange on the outlet end set at substantially a right angle and a flange on the inlet end set outwardly and obliquely towards the centre, at least one spiral rib on the internal wall of said drum set to cause sugar to travel to the inlet end, said rib having a fin on the inlet end which projects towards the centre of the drum, a ring on said fin, a cylinder having open ends with a flange on the outlet end to register with the substantially right angle flange on the drum and a flange on the inlet end set outwardly and obliquely towards the centre with fin thereon adapted to register with the ring on the drum fin, the first part of said cylinder that is at the inlet end being made of a sheet material and the other part made of a perforated material, at least one spiral rib on the internal wall of the cylinder set to cause jubes to travel through the cylinder and fall from the outlet end, separate means to deliver sugar to the machine consisting of a hopper pivotally mounted on a frame at the outlet end of the machine, a gravity discharge outlet from said hopper with a valve thereon, a gravity discharge chute extending from the outlet into the cylinder adjacent the junction of said first part with the other part, means to direct sugar falling from the fins into the cylinder consisting of a ramp mounted on a frame on the discharge end of a jube conveyor said conveyor being mounted on supports arranged so that the conveyor can be moved to a position where said ramp projects into the inlet end of the machine in receiving relationship to the fin on the drum, means to rotate said drum.

References Cited in the file of this patent
UNITED STATES PATENTS

| | | |
|---|---|---|
| 1,391,604 | Baumgard | Sept. 20, 1921 |
| 1,497,126 | Stead | June 10, 1924 |
| 1,739,642 | Light | Dec. 17, 1929 |
| 1,819,557 | Hunter | Aug. 18, 1931 |
| 2,336,298 | Rubens et al. | Dec. 7, 1943 |
| 2,377,964 | Ransohoff | June 12, 1945 |
| 2,536,662 | Roth | Jan. 2, 1951 |